Nov. 2, 1948.  W. H. BUTLER  2,452,992
COATING COMPOSITION OF FATTY DRYING OILS REACTED
WITH FATTY ACID MODIFIED POLYHYDRIC ALCOHOL
ESTERS OF CYCLOPENTADIENE MALEIC ADDUCT
Filed May 29, 1943
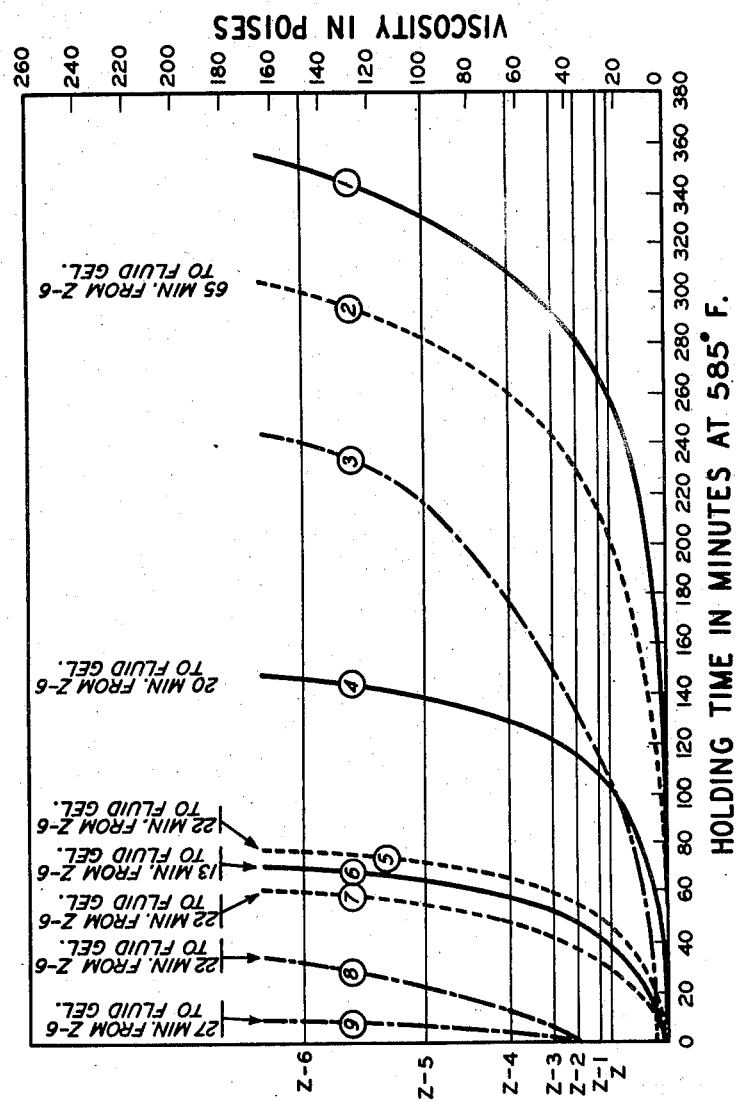
INVENTOR
WILLIAM H. BUTLER
BY
ATTORNEY Patented Nov. 2, 1948

2,452,992

UNITED STATES PATENT OFFICE 2,452,992

COATING COMPOSITION OF FATTY DRYING OILS REACTED WITH FATTY ACID MODIFIED POLYHYDRIC ALCOHOL ESTERS OF CYCLOPENTADIENE MALEIC ADDUCT

William H. Butler, Bloomfield, N. J., assignor to Bakelite Corporation, a corporation of New Jersey Application May 29, 1943, Serial No. 489,062

10 Claims. (Cl. 260—22)

This invention relates to coating compositions or binders incorporating conjugated or non-conjugated drying oils.

In a copending application Serial No. 351,235 filed August 3, 1940, for Ester resin compositions which has since become Patent 2,397,240, March 26, 1946, there are disclosed ester resins which can be heat-processed or blended with conjugated and non-conjugated drying oils. The ester resins that can be so processed are obtained by reacting (1) a polyhydric alcohol (preferably in excess of equivalent weights to provide for loss by distillation) with (2) the cyclopentadiene adduct of maleic acid or its anhydride and (3) a monobasic saturated or unsaturated fatty acid having 5 to 22 carbon atoms in the chain such as caproic, lauric, myristic, hypogaeic, palmitic, stearic, licanic, eleostearic, oleic, linoleic, linolenic, clupadonic or mixtures of such acids; these are acids which for the most part can be isolated by saponification from drying, semi-drying or non-drying vegetable and fish oils, and in place of the acids their partial esterification products with polyhydric alcohols can be substituted, such as the mono-substituted glycols, mono- and diglyceride, etc. The resins are low-polymer mixed esters of a heat-reactive type with acid values ranging from 10 to 90. They are described as useful both for direct application as coatings and for intermediates for incorporation with drying or semi-drying oils in which they are readily soluble. The present application is a continuation-in-part of the parent case, and it is directed to compositions of the ester resins included as intermediates in conjunction with drying oils.

When the ester resins are intended for coatings without further reaction or addition, the monobasic acid constituent, calculated as the triglyceride, should constitute at least 50 per cent of the reaction mass; this percentage, however, can be reduced when the ester product can be plasticized or have included in it a saturated or non-conjugated monobasic acid, such as lauric acid from coconut oil or hypogaeic acid from peanut oil, in an amount to impart the requisite flexibility to a deposited film.

But with drying oil additions it has been found that the monobasic acid or equivalent reactant need not constitute 50 per cent of the ester-forming reaction mass. In general some of the monobasic acid component is required for the production of an oil-soluble low molecular weight ester resin that is of low polymerization; the extent of polymerization is indicated by the viscosity of a solution of 3 parts of the ester resin in 1 part of toluol, and for incorporation with a drying oil the viscosity should preferably range from about 2.5 to 12 poises at 25° C. Other factors besides the percentage of monobasic acid, however, modify the viscosity, such as the polyhydric alcohol used, the fatty acid chain as well as the extent to which polymerization is advanced by carrying on the reaction. To illustrate, varying amounts by weight of soya bean oil were converted into partially esterified acids by running with glycerine and litharge catalyst to 230° C. and holding for 20 minutes, or until a sample reduced with 5 parts by weight of methanol yielded a clear solution, as follows:

| Component | Expt. 1 | Expt. 2 | Expt. 3 |
|---|---|---|---|
| | Parts | Parts | Parts |
| Soya bean oil | 41.9 | 27.8 | 17.2 |
| Glycerine | 11.7 | 6.1 | 3.9 |
| Litharge | 0.09 | 0.05 | 0.03 |

To the products were added the cyclopentadiene adduct of maleic anhydride and diethylene glycol as follows:

| Component | Expt. 1 | Expt. 2 | Expt. 3 |
|---|---|---|---|
| | Parts | Parts | Parts |
| Adduct | 37.9 | 46.2 | 51.6 |
| Diethylene glycol | 8.3 | 19.7 | 27.0 |

The mass was held at 200° C., and at different time intervals samples were tested for acid number, viscosity and oil-solubility; the oil-solubility was determined by an accelerated test which comprised heating equal parts of a sample with the oil to about 280–300° C. or a temperature at which a drop was clear at room temperature; the following data were obtained:

| Expt. | Heating period | Acid No. | Viscosity | Oil-Solubility |
|---|---|---|---|---|
| | Hours | | Poises | |
| 1a | 5 | 35.0 | 2.50 | O. K. |
| 1b | 8.5 | 17.2 | 9.33 | O. K. |
| 2a | 5 | 46.4 | 1.8 | O. K. |
| 2b | 9 | 39.6 | 2.62 | Resin gelled at 270° C. |
| 3 | 5 | 48.7 | 4.32 | Resin gelled at 291° C. |

From the foregoing data it is apparent that with relatively large proportions of a monobasic acid (experiment 1) the viscosity was advanced by heat polymerization to a high degree without loss of oil-solubility, but with a low proportion of monobasic acid (experiments 2b and 3), gelation of the resin and consequent non-solubility in the oil occurred at a much lower viscosity or polymerization. Accordingly, while a viscosity measurement is indicative of the extent of polymerization, it is also a measure of the monobasic acid content; and since it is fundamentally the viscosity of the resin which governs its compatibility and incorporation with drying oils, a limiting or critical range of monobasic acid proportion is indeterminate and cannot be expressed.

So far as known, the ester resins, formed by reacting the cyclopentadiene adduct of maleic acid or its anhydride and a monobasic fatty acid with a polyhydric alcohol, are strikingly differentiated from alkyd ester resins prepared from phthalic anhydride as the dibasic acid or from other adducts of maleic acid, in that upon processing with a conjugated or non-conjugated double bond drying oil a most marked acceleration of the polymerization and drying is imparted to the resulting composition. The drying oils, including semi-drying oils, which can be so accelerated by the ester resins of this invention comprise: slow drying, non-conjugated double bond oils as linseed, soya, Perilla, and peanut; conjugated oils such as China-wood; oiticica; oils processed to contain conjugated double bond groups, such as dehydrated castor oils, or other types derived by shifting an unsaturated bond in non-conjugated drying oils to a conjugated position by treating with alkali in solvent, or by controlled oxidation, etc. The ester resins of this invention are particularly useful with oils that are normally slow drying and other oils that do not possess conjugated double bonds, since the effect is to form products that can be processed on a time cycle comparable to compositions prepared from conjugated double-bond oils, such as tung or oiticica oils; and the final acid values of the reaction products are comparable to or lower than that of the oils themselves when oxidized or polymerized. Compositions of the ester resins with drying oils are useful as coatings; but they also have properties of conjugated double-bond drying oils, and for that reason they can be formulated in varying proportions with hard oil soluble synthetic resins, such as the oil-soluble or the rosin-modified phenolics, rosin-modified maleics, coumarone, indene resins, ester gum, etc., together with the usual thinners, etc., to make varnishes. Alone or as drying oil substitutes in varnishes, the ester resin and oil compositions deposit films which polymerize rapidly with considerably accelerated surface drying upon contact with air, i. e. they air-dry at room temperature within two or three hours to solid coatings, and these coatings are of pale color, improved hardness and alkali resistance and retain film-flexibility upon aging; upon baking at temperatures as low as 95° C. the films solidify within a few minutes.

The evidence indicates that an ester resin, prepared from the cyclopentadiene-maleic acid adduct and a monobasic acid with a polyhydric alcohol, copolymerizes with a conjugated or non-conjugated double-bond drying oil in yielding a viscous liquid reaction product, particularly when cooked or processed at a temperature of 175° C. or above; the reaction product polymerizes rapidly upon further heating. Copolymerization of the ester resin and an oil also appears from the fact that the ester resin (when in minor proportion) completely loses its identity and cannot be separated by chemical analysis; this is not true, for instance, of a typical alkyd type ester resin prepared from phthalic anhydride as the dibasic acid, for phthalic acid can be separated quantitatively from a cook of such a resin with a drying oil. Additional indication of a copolymer reaction is that the ester resin forms copolymers when reacted with monomers such as styrene, acrylonitrile, vinyl acetate and methyl methacrylate. It is generally agreed, moreover, that in the conversion of drying oils either by heat or oxidation from liquids to gelled masses or dried films, there is a polymerization at least in the final stages of drying, though the rate is influenced by catalysts such as metallic driers, peroxides, ultra-violet light, etc.; for instance, in the gelation of raw or monomeric linseed oil caused by oxidation, there is a hydroperoxide formation followed by a rearrangement into a conjugated system and then by a polymerization indicated by the rapidity of increase in density, of decrease of specific refraction and of drop in iodine value. The polymerizing mechanism thus determined in the case of linseed oil alone undoubtedly is a factor in the formation of a copolymer from the ester resin and a drying oil.

In further substantiation of a copolymerization type of reaction taking place, it has been found that in the reaction of the ester resin with a conjugated oil, such as tung oil, the time rate of solidification is independent of the polymerization time of the ester resin alone. For example, two ester resins were prepared as follows (all parts being by weight):

(A) 49.16 parts of linseed oil, 10.88 parts of glycerine, and .08 part of litharge were run to 220° C., held for 20 minutes; the product was a mixture of predominantly monoglycerides of the unsaturated linseed oil fatty acids, and with it were reacted 35.37 parts of the cyclopentadiene adduct of maleic anhydride and 4.51 parts of glycerine, the reaction being held at a temperature of about 200° C. to an acid value of 45 to 60 and viscosity of about 8 poises when reduced with toluol in the proportion of 3 resin to 1 toluol; the ester resin so made polymerized upon air-drying to a hard, solvent-resistant, flexible coating, and at 250° C. it polymerized to a solid in 18 minutes; the resin at a viscosity of 12 poises was readily compatible with drying oils at room temperature, and oil-solubility did not become critical until reacted to a viscosity of about 50 poises.

(B) 35.5 parts of the cyclopentadiene adduct of maleic acid, 36.5 parts of lauric (saturated) acid, 4.12 parts of castor oil, 23.82 parts of glycerine and 0.06 part of litharge were reacted together at a temperature of about 200° C. to an acid number of 3–8 and a viscosity of about 12 poises in toluol solution; the resin was one that at room temperature did not yield a dry coating, and at 250° C. it polymerized to a solid in 40 minutes; in the viscosity region of 35 to 40 poises (toluol solution) the resin was tacky and viscous at 25° C. but oil-soluble, and at a viscosity of 70 poises it was not readily dispersible in a drying oil. Both resins (A) and (B) were mixed with tung oil in the proportion of 1 part resin to 2 parts tung oil (25 gallon oil length), the tung oil alone having a polymerization time of 27.5 minutes at 250° C.; the time for polymerization to a solid gel of the resin A and oil composition at 250° C. was 11 minutes, while the composition of the resin B and oil polymerized in 5 minutes. In other words, the copolymer reaction of resin A with tung oil accelerated the polymerization as compared to tung oil alone 2.5 times, and the reaction of resin B with tung oil accelerated the polymerization 5.5 times; resin B alone, however, required more than twice as long a period for polymerization as did resin A. Other data obtained shows that when the oil-reactive ester resins formed 20 per cent of the compositions (50 gallon oil length), correspondingly accelerated reaction times were obtained, and there was no observable dilution effect.

The rate of viscosity increase is of the same order as the polymerization rate; and a long induction period, which may be several hours during which there is very little increase in viscosity when using with drying oils other types of resins, such as the rosin-modified glycerolphthalate alkyd resins, ester gums or rosin-modified phenolic resins, is practically eliminated. Both the rate of viscosity increase and of polymerization of the composition can be accelerated by first heat-treating an oil, such as linseed oil, at about 260° to 315° C. to raise its viscosity, preferably not much above a body Q, and then processing with the ester resin here described; compositions based on the bodied oils yield harder films on air-drying. Again, when the resin and oil composition is at an increased viscosity, such as a value of Z2 or higher, the composition shows great reactivity on the surface exposed to air; in order to retain this reactivity, it is preferable to carry the composition to such a viscosity under an inert atmosphere and so avoid the forming of insoluble surface products prior to reduction with thinner. There are definitely two reactions which take place in the solidification of the composition, polymerization and surface reactivity, and these can be noted by physical tests and observation.

In the accompanying drawing the figure is a chart showing a series of curves based on data obtained in the reactions of the ester resin A with a non-conjugated oil in different conditions of viscosity or body and in different proportions; linseed oil was selected. The curves show the viscosity increases and the final gelation point, and they were plotted from data obtained by removing samples at intervals while maintained at a temperature of 300° C. (585° F.). Curves 1, 4 and 6 are based on the treatment of non-bodied alkali-refined linseed oil, curves 2, 5 and 7 on non-bodied catalyzed linseed oil, and curves 3, 8 and 9 on body Q linseed oil; curves 1, 2 and 3 were plotted on data derived by heating the differently treated linseed oils alone, and the remaining curves are based on the processing of the different types of linseed oil with an ester resin; in the compositions, on which curves 4, 5 and 8 are based, the resin formed 15% of the composition (75 gallon oil length), and for curves 6, 7 and 9 the resin formed 20% of the composition (50 gallon oil length). From these curves it can be noted that the ester resin materially reduces the normal induction period over that for the linseed oil alone to reach a viscosity of Z or Z–1 (on the Gardner-Holdt scale), and it greatly reduces the time period from Z or Z–1 to final gelation. The chart further shows that the compositions based on body Q linseed oil were fastest, the oil alone requiring 235 minutes to reach a gel stage (viscosity of 148 poises) and the composition reaching the same viscosity with 15 per cent ester resin in 33 minutes and with 20 per cent ester resin in 7 minutes; i. e., in comparison with oil alone, the speed of viscosity increase was accelerated 7 times with 15 per cent of resin in the composition and about 34 times with 20 per cent of resin in the composition. The rates of acceleration closely parallel those of the compositions containing the conjugated oils, and similar acceleration rates were obtained with other non-conjugated oils, such as soya bean, fish, Perilla, etc.

The improvements in the properties of air-dried films of compositions in which the cyclopentadiene-maleic adduct ester resin is incorporated, is shown by the following table comparing its properties with those of the oil alone and of oils processed with other resins. In each case the proportions were such as to give an oil length of 75 gallons, and the compositions were heated at the temperatures noted and held to the viscosities stated. All the samples were then reduced to a viscosity E (1.25 poises) with mineral spirits, and driers were added equivalent to .015 per cent cobalt plus 0.15 per cent manganese plus .05 per cent lead calculated on the weight of solids. Glass test tubes were dipped in the varnishes and air-dried for 8 days. The tubes were then immersed in water for 6, 24 and 48 hours.

The air-dried films were also tested for hardness by flowing the varnishes at viscosity E on glass plates and determining the hardness by the Gardner-Holdt swinging beam; the values on this apparatus range from 0 second to approximately 300 seconds which corresponds to the hardness of glass. The hardness values were noted when the films were sufficiently set to permit a reading, though for some films the first interval of 4.5 hours exceeded the set time. At a reading of 25 seconds the films were set and firm but varied in degree of surface dryness.

| Composition | Viscosity Poises | Water Resistance of Films | | | Hardness of Film in Seconds | | | | |
|---|---|---|---|---|---|---|---|---|---|
| | | 6 hrs. | 24 hrs. | 48 hrs. | 4½ hrs. | 6 hrs. | 24 hrs. | 48 hrs. | 1848 hrs. |
| ES. R. A. QLO—540° F | 40.60 | O. K. | O. K. | Sl. haze | 33–36 | 30–30 | 29–26 | 23–20 | 33–36 |
| O. S. PH. R. QLO—540° F | 37.1 | O. K. | O. K. | do | Wet | Wet | Wet | 23–23 | 56–59 |
| M. PH. R. QLO—540° F | 34.9 | O. K. | Sl. haze | V. hazy | do | 13–16 | 16–16 | 13–13 | 66–62 |
| M. A. R. QLO—540° F | 38.9 | Sl. haze | do | do | do | Wet | 13–13 | 13–13 | 69–66 |
| Ester Gum QLO—540° F | 44.1 | do | Haze | do | do | 10–10 | 13–10 | 10–10 | 60–59 |
| QLO alone 540° F | 35.1 | O. K. | O. K. | Sl. haze | do | 36–33 | 33–29 | 26–26 | 23–23 |
| ES. R. A. RLO—585° F | 43.10 | O. K. | O. K. | O. K. | 33–35 | 39–34 | 26–23 | 20–20 | 32–33 |
| ES. R. A. QLO—585° F | 36.05 | O. K. | O. K. | O. K. | 29–27 | 30–31 | 26–26 | 20–20 | 33–33 |
| ES. R. A. RLO—560° F | 38.85 | O. K. | O. K. | O. K. | 36–27 | 32–30 | 29–26 | 26–27 | 33–33 |
| RLO—585° F | 50.15 | O. K. | O. K. | O. K. | | 32–33 | 33–29 | 26–26 | 25–26 |

NOTE:
ES. R. A. = Ester Resin A (supra)
O. S. PH. R. = Oil Soluble Phenolic Resin
M. PH. R. = Rosin-Modified Phenolic Resin
M. A. R. = Rosin-Modified Alkyd Resin
QLO = Body "Q" Linseed Oil
RLO = Alkali Refined Linseed Oil
Sl. = Slight
V. = Very From the table it is to be noted that the ester resin A when copolymerized with linseed oil improves the water resistance of the films, and in this respect is superior to the other resins listed except the straight oil-soluble phenolic resin. A quick set or air-drying also is obtained, and the films remain at a stabilized hardness over an extended period; with the other resins there is a relatively slow initial drying, and there is a continuation of the hardening over the test period. The ester resin and oil copolymers were superior as to surface dryness, but this fact does not appear from the hardness values.

The ester resins can be included in oils in any proportions, and the compositions can be modified with rosin, ester gum, oil-soluble phenolic resins, alkyd resins, etc. Extremely long oil compositions, containing as much as 90 per cent of oil, are found to retain the properties of heat-reactivity and polymerization; such compositions find their principal utility as drying oil substitutes, and soya bean oil for example is so improved with 10 per cent of the ester resin as to approach tung oil by polymerizing to a solid at about 250° C. within 50 minutes. At the other extreme of short oil compositions having only about 10 per cent of oil, there are obtained compositions which when baked, and particularly when plasticized, yield hard, tough and highly resistant coatings; suitable plasticizers include the well known resin plasticizers as triphenyl phosphate, tricresyl phosphate, dibutyl phthalate, etc.

The oil and resin compositions, particularly with ester resins made from soya bean oil fatty acid or the mono- or di-glyceride thereof as the monobasic acid, yield films of a very pale color and hardness, and the color is remarkably fast; these properties permit their use for preparing white enamels that show little if any change in color on aging. They are also characterized by a marked improvement in gloss retention upon exposure to weathering as compared for example with compositions of linseed oil and a resin such as ester gum or a rosin-modified phenolic resin. The high gloss coupled with rapid hardening make them useful for printing inks; for this purpose Perilla, linseed oil or the like are preferred and the usual pigments as carbon black, Prussian blue, etc. are added.

Some examples of specific compositions illustrating the invention are appended.

*Example 1.*—About 750 parts of the cyclopentadiene adduct of maleic anhydride and 354 parts of glycerine were reacted together for about 15 minutes at 200° C. Then a mixture of 300 parts of linseed fatty acids and 700 parts of soya bean fatty acids were slowly added to the charge, and the reaction was continued for about 4 hours at 200° C.; the fatty acids constituted about 55 per cent of the ester product. A very pale liquid ester resin with an acid value of about 35 to 50, a viscosity of about 10 poises in toluol solution, and readily soluble in linseed or tung oil, was obtained. On continued heating at 200° C. the final end product was a rubbery infusible gel.

When the ester resin was mixed with alkali-refined linseed oil, in the proportion of one of resin to four of oil, the composition had a high body upon heating for 30 minutes at 450 to 500° F. and an acid value of from 2 to 8. When reduced with thinner and applied as a coating, it yielded a solid film of very pale color on baking for 7 minutes at 95° C. The compositions can be mixed with ester gum or other cheapening ingredients and still yield finishes competing in cost and speed of drying with varnishes made from faster drying oils. A use made of these compositions is as binders in glass wool fiber bats.

The ester resin when extended with about 10 per cent of linseed oil of body Q reacted rapidly on heating to 240° C. to a dry pulverizable mass. Such products have found particular utility as binders for brake linings.

*Example 2.*—Diluents such as ester gum have only a small retardation effect on the polymerization of the compositions. About 40 parts of the resin of Example 1 were mixed with 40 parts of ester gum and about 37 parts of Perilla oil bodied to viscosity of Z2 (Gardner-Holdt viscosimeter); the mass was raised to a temperature of about 250° C. within a half hour and held there for a few minutes, and then about 74 parts more of the oil were slowly added; the temperature of 250° C. was again reached and held for a few minutes. Then the reaction was checked by stirring in about 20 parts more of ester gum, and the mass was cooled and thinned with an equal weight of mineral spirits. The product had a viscosity of E (Gardner-Holdt scale) with a non-volatile content of about 50 per cent and a color of 4-5 (as determined by a Hellige comparator). It dried fairly hard in about 1.5 hours to give a film of high gloss and pale color.

Various other resins as coumarone indene resins, Congo and rosin can be substituted for ester gum, and the proportions can be widely varied; they serve as diluents. Pigments can also be added for producing enamels.

*Example 3.*—420 parts of the adduct of maleic anhydride were mixed with 219 parts of glycerine, and the mixture was raised to 210° C. in twenty minutes and held for a few minutes. Linseed fatty acids in three portions of 187 parts each were added one at a time, regaining the temperature after each addition. After heating for 2.5 hours, about 20 parts of glycerine were added, and the reaction was continued until the acid number was reduced to 47 and the viscosity was about 9 poises in toluol solution. The fatty acid reactant constituted about 55 per cent of the ester resin which, when used alone for coatings, polymerized to a very hard but flexible film.

One part of the resin was mixed with 1 part of linseed oil (body Q) and gradually heated. Upon reaching a temperature of about 260° C. the viscosity increased so rapidly that it was necessary to check with another part of the linseed oil, and again on reaching 260° C. the mass became viscous; it became a solid gel on heating to 275° C. The same ingredients in the same proportions were heated, after the second addition of linseed oil, to about 230° C. and reduced with Varsol (hydrocarbon thinner) to a viscosity E; the varnish had a solids content of 60 per cent, and a trace of drier was included. In a baking test at 125° C. a film of the composition set in one to three minutes to a dry surface and without any wrinkling; and when the baking was continued for 30 minutes the film had a hardness of 21 sec. (by the Gardner-Holdt swinging beam method).

*Example 4.*—About 100 parts of the maleic anhydride adduct and 44 parts of the glycerine were heated up to about 190° C. and held for a few minutes. To this were added 30 parts of linseed fatty acid and 70 parts of soya bean fatty acid, divided into three equal portions, and the temperature was raised to about 190° to 200° C. after each addition. When held at this temperature for about 2 hours, there was obtained a soft viscous resin intermediate of pale straw color and having an acid value of 35 to 50 and a viscosity of about 3 poises in toluol solution.

The resin was run with an equal weight of linseed oil, heat-bodied to viscosity N to 200° C. and then run to 260° C. after 3 more parts of the linseed oil had been included. The mass was cooled and checked with mineral spirits to a solution having a solids content of 70 per cent; it had an acid number of 2.9 and a color of 3–4. The solution in a thin film rapidly polymerized on baking at a temperature as low as 68° C. Such a composition is particularly useful as a vehicle for printing inks on account of its high gloss, flow and rapid hardening on heating. Because of its neutral condition, the composition can be pigmented with zinc oxide and other basic pigments.

*Example 5.*—120 parts of linseed oil, 30.2 parts of diethylene glycol and 0.18 part litharge were run to 220° C. and held for 20 minutes at 220° C.; to the reaction mass were added 86.8 parts of the cyclopentadiene adduct of maleic anhydride and 12.2 parts of pentaerythritol, and the reaction was held for 4½ hours at 200° C. The ester resin so made had an acid number of 48.6 and a viscosity of 3.7 poises in toluol solution.

When the resin of this example was reacted with alkali refined linseed oil (75 gallon oil length) at a temperature of 585° F., the composition polymerized at a rate to yield a curve identical with curve 4 of the graph of the drawing. The polymerization time for the resin alone at 250° C. was 17 minutes, and in the proportions of one part resin and 2 parts of tung oil the polymerization time was 14 minutes. The composition with the addition of a low percentage of soluble metallic drier polymerized to a hard solvent-resistant, flexible coating, both by air-drying and by baking.

What is claimed is:

1. Composition useful for coatings comprising the reaction product of a fatty drying oil with a polyhydric alcohol ester of a cyclopentadiene-maleic adduct and a reactant in amount sufficient to impart to the ester solubility in fatty drying oils, said reactant selected from the group consisting of monobasic fatty acids having 5 to 22 carbon atoms in the chain and their partial esterification products with a polyhydric alcohol, the fatty drying oil constituting at least 10% of the reaction product, and the product being characterized by polymerizing and increasing its viscosity upon heating more rapidly than the fatty drying oil alone.

2. Composition useful for coatings comprising the reaction product of a fatty drying oil with a polyhydric alcohol ester of a cyclopentadiene-maleic adduct and a reactant in amount sufficient to impart to the ester solubility in the fatty drying oil, said reactant selected from the group consisting of monobasic fatty acids having 5 to 22 carbon atoms in the chain and their partial esterification products with a polyhydric alcohol, said ester having a viscosity ranging from about 2.5 to 12 poises in a toluol solution of 3 parts of the ester to 1 of toluol, the fatty drying oil constituting at least 10% of the reaction product and the product being characterized by polymerizing and increasing its viscosity upon heating more rapidly than the fatty drying oil alone.

3. Composition useful for coatings comprising the reaction product of a non-conjugated unsaturated fatty drying oil with a polyhydric alcohol ester of a cyclopentadiene-maleic adduct and a reactant in amount sufficient to impart to the ester solubility in the fatty drying oil, said reactant selected from the group consisting of fatty acids having 5 to 22 carbon atoms in the chain and their partial esterification products with a polyhydric alcohol, the fatty drying oil constituting at least 10% of the reaction product and the product being characterized by polymerizing and increasing its viscosity more rapidly upon heating than the fatty drying oil alone.

4. Composition useful for coatings comprising the reaction product of linseed oil with a polyhydric alcohol ester of a cyclopentadiene-maleic adduct and a reactant in amount sufficient to impart to the ester solubility in linseed oil, said reactant being selected from the group consisting of fatty acids having 5 to 22 carbon atoms in the chain and their partial esterification products with a polyhydric alcohol, the linseed oil constituting at least 10% of the reaction product and the product being characterized by polymerizing and increasing its viscosity more rapidly upon heating than the linseed oil alone.

5. Composition useful for coatings comprising the reaction product of soya bean oil with a polyhydric alcohol ester of a cyclopentadiene-maleic adduct and a reactant in amount sufficient to impart to the ester solubility in the soya bean oil, said reactant selected from the group consisting of fatty acids having 5 to 22 carbon atoms in the chain and their partial esterification products with a polyhydric alcohol, the soya bean oil constituting at least 10% of the reaction product and the product being characterized by polymerizing and increasing its viscosity more rapidly upon heating than the soya bean oil alone.

6. Composition useful for coatings comprising the reaction product of linseed oil with the glycerol ester of a cyclopentadiene-maleic adduct and linseed oil fatty acids in amount sufficient to impart to the ester solubility in the linseed oil, at least 10% of the reaction product consisting of linseed oil and the product being characterized by polymerizing and increasing its viscosity more rapidly upon heating than the linseed oil alone.

7. Composition useful for coatings comprising the reaction product of a fatty drying oil with the glycerol ester of a cyclopentadiene-maleic adduct and soya bean oil fatty acids in amount sufficient to impart to the ester solubility in the fatty drying oil, at least 10% of the reaction product consisting of the fatty drying oil and the product being characterized by polymerizing and increasing its viscosity more rapidly upon heating than the fatty drying oil alone.

8. Process of preparing a coating composition which comprises mixing a fatty drying oil with a polyhydric alcohol ester of a cyclopentadiene-maleic adduct and a reactant in amount sufficient to impart to the ester solubility in the fatty drying oil, said reactant being selected from the group consisting of fatty acids having 5 to 22 carbon atoms in the chain and their partial esterification products with a polyhydric alcohol the fatty oil constituting at least 10% of the reaction mixture, and heating the mixture to at least 175° C. until a viscous liquid is obtained which polymerizes more rapidly upon heating than the fatty oil alone.

9. Composition useful for coatings comprising a hard fatty oil-soluble synthetic resin in admixture with the reaction product of linseed oil and a polyhydric alcohol ester of a cyclopentadiene-maleic adduct and a reactant in amount sufficient to impart to the ester solubility in the drying oil, said reactant selected from the group consisting of fatty acids having 5 to 22 carbon atoms in the chain and their partial esterification products with a polyhydric alcohol, at least 10% of the reaction product consisting of linseed oil, and the reaction product being characterized by polymerizing and increasing its viscosity more rapidly upon heating than the linseed oil alone.

10. Composition useful for coatings comprising the reaction product of tung oil with a polyhydric alcohol ester of a cyclopentadiene-maleic adduct and a reactant in amount sufficient to impart to the ester solubility in the tung oil, said reactant selected from the group consisting of fatty acids having 5 to 22 carbon atoms in the chain and their partial esterification products with a polyhydric alcohol, the tung oil constituting at least 10% of the reaction product and the product being characterized by polymerizing and increasing its viscosity more rapidly upon heating than the tung oil alone.

WILLIAM H. BUTLER.

REFERENCES CITED

The following references are of record in the file of this patent:

UNITED STATES PATENTS

| Number | Name | Date |
|---|---|---|
| 1,893,873 | Kienle | Jan. 10, 1933 |
| 2,218,553 | Rosenblum | Oct. 22 1940 |
| 2,251,297 | Soday | Aug. 5, 1941 |
| 2,318,034 | Wayne | May 4, 1943 |
| 2,397,240 | Butler | Mar. 26, 1946 |

FOREIGN PATENTS

| Number | Country | Date |
|---|---|---|
| 352,164 | Great Britain | July 9, 1931 |
| 468,542 | Great Britain | July 7, 1937 |

OTHER REFERENCES

Ellis: Chemistry of Synthetic Resins, vol. II, p. 835, 884 and 895 (1935).